E. S. MATTHEWS.
INDICATING AND RECORDING LIQUID FUEL SUPPLY TANK APPARATUS.
APPLICATION FILED FEB. 18, 1918.
1,400,895. Patented Dec. 20, 1921.
3 SHEETS—SHEET 2.
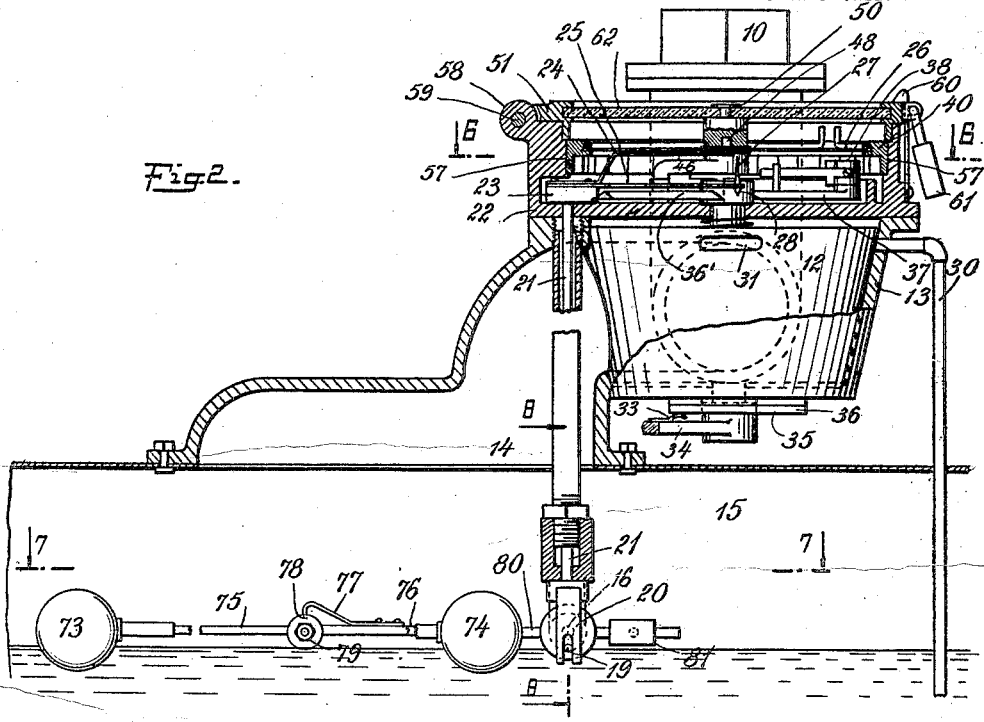
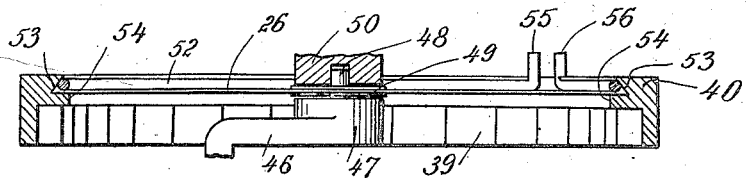
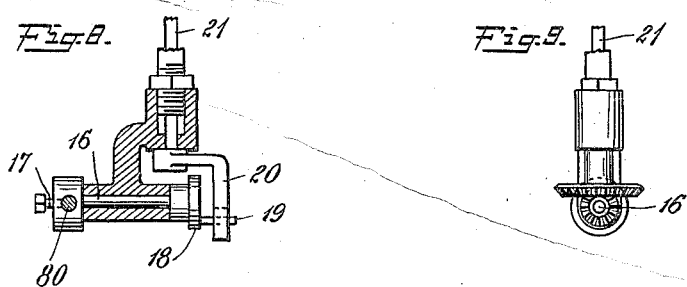
INVENTOR
Edwin S. Matthews.

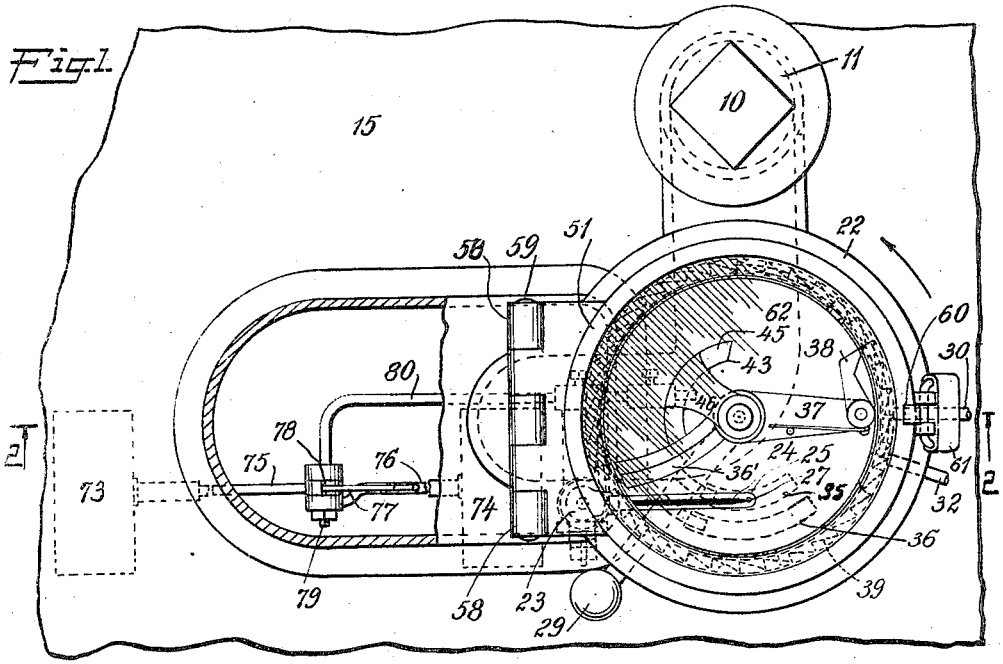
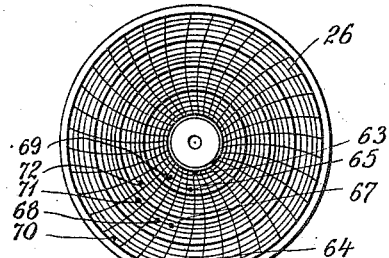
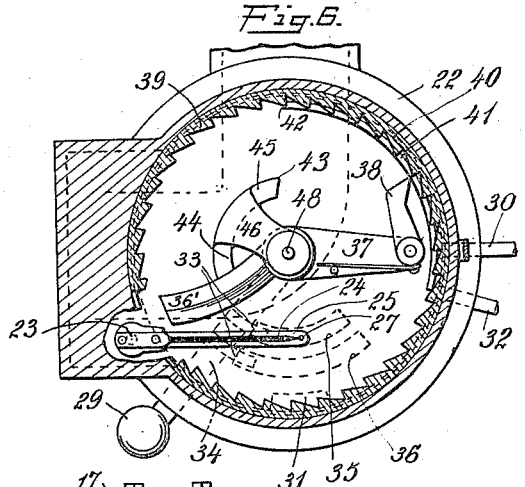
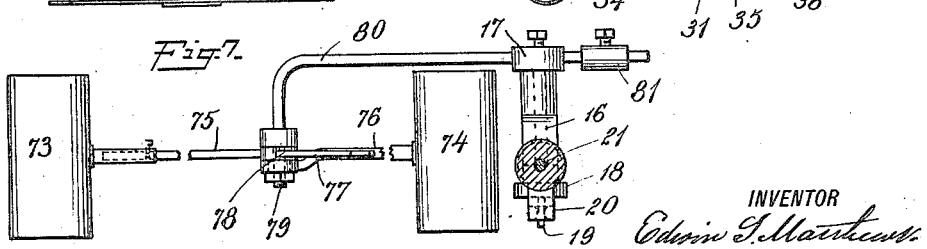

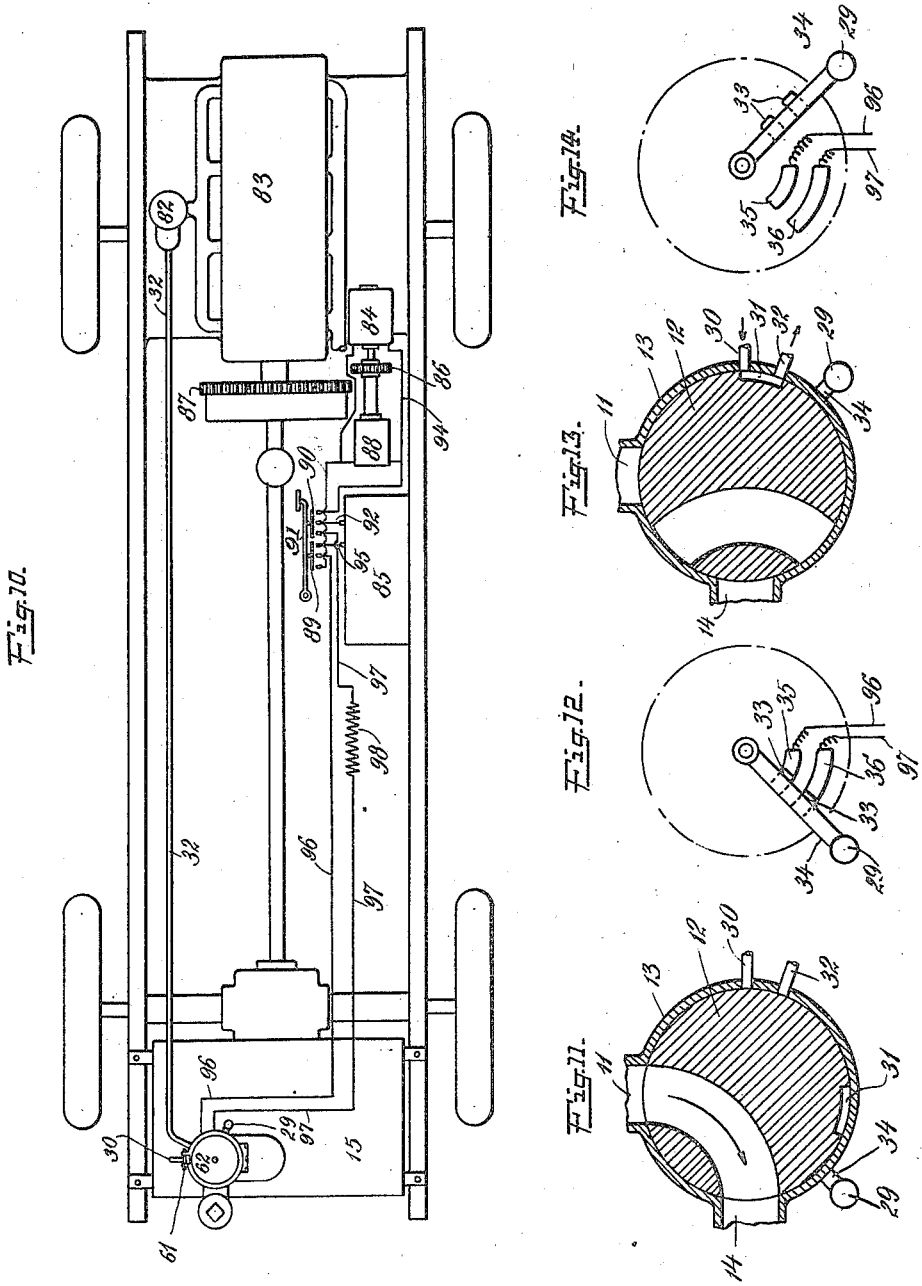

UNITED STATES PATENT OFFICE.

EDWIN S. MATTHEWS, OF NEW YORK, N. Y.

INDICATING AND RECORDING LIQUID-FUEL-SUPPLY-TANK APPARATUS.

1,400,895.     Specification of Letters Patent.     Patented Dec. 20, 1921.

Application filed February 18, 1918. Serial No. 217,983.

*To all whom it may concern:*

Be it known that I, EDWIN S. MATTHEWS, a citizen of the United States of America, and a resident of the borough of Manhattan, city, county, and State of New York, have invented certain new and useful Improvements in Indicating and Recording Liquid-Fuel-Supply-Tank Apparatus, of which the following is a full, clear, and exact description, reference being had to the accompanying drawings, which form a part of this specification.

My present invention relates to indicating and recording liquid fuel supply tank apparatus, providing a device by means of which the amount of gasolene or other liquid fuel present within the tank is at all times indicated for inspection, and may be, if desired, recorded at any time; and further, it produces an automatic record of any and all amounts or quantities of gasolene or other liquid fuel entering the tank at each and every filling or replenishment thereof, whether the replenishment of the tank be complete on only partial; the replenishment record being invariably made as a result of the automatic operation of the apparatus.

The embodiment of the invention herein shown and described is suitable for use with an internal combustion gasolene engine, although the invention is not restricted to such use, as it may be otherwise employed, for example, in cases where a liquid fuel is externally burned or used to generate steam for power purposes.

A useful application of this invention is found in the supply tanks of automobiles (although obviously it is not limited to this use), for in such case it affords the owner an accurate, automatic record of the amount of gasolene actually used by his individual car whether for any given trip or during any given time, as he may desire.

Further, it effectually prevents unauthorized use of his car, for on sending the car to and on receiving it from the garage, the owner can record the state of the tank supply;—and any depletion of this supply, or any use of a portion thereof and any subsequent refilling of the same, is automatically recorded by this invention;—while the application of this invention to other liquid fuels used to generate power and to gasolene motors used for other purposes is obvious.

In general, the embodiment of the invention herein shown records the state of tank supply from the height of the liquid within it;—a compensating float of novel construction, permitting its introduction into the tank through a small aperture, and compensating for variations from normal horizontal position of the tank, transmitting its position to an indicator hand and a recording arm, which coöperate with a properly calibrated circular record card; this latter card being suitably punched and advanced properly for the different individual records by the automatic operation of the apparatus.

The power, for automatically accomplishing the recording upon and advancing of the record card, is furnished by the manual operation of a member, which must be moved to a proper extent in order to secure the filling of the tank and operation of the gasolene motor. In this embodiment of the invention, this member also acts to cause the opening and closing of a filling valve obstructing, when closed, the filling channel of the tank; and when open, or not fully brought to closed position, rendering the motor inoperative; thus making the proper operation of this aforesaid member obligatory in order to fill the tank and subsequently to start the motor into operation; and in this embodiment of the invention this filling valve is provided with proper lap so that in filling or replenishing the tank the motor is incapacitated before the filling channel of the tank can be opened, and the motor is rehabilitated only when this fuel valve has been fully closed against tank filling and also advanced over this lap. This latter property of the invention is a safety feature, preventing the possible starting of an automobile during the process of filling its supply tank, and insuring that the filling aperture of the supply tank shall be safely closed before the motor can be started.

Whenever it is desired to simply record the state of tank supply, this member is merely operated without filling the tank.

Means for holding the record card in the apparatus, so as to leave both of its working surfaces free from obstruction, for the purpose of observation and recording, is also embodied in this apparatus; and also coöperating card advancing and stop mechanisms are included therein.

Other advantages, objects and features of the invention will become manifest to those skilled in the art, as this embodiment of its mechanism and its mode of operation are hereinafter explained and its novel features pointed out in the claims.

The exemplifying structure embodying this invention is illustrated by the following drawings:

Figure 1 is a plan view (partly broken) of the fuel valve, recording apparatus, and directly associated parts with the record card removed in order to more clearly show its mechanism.

Fig. 2 is a mainly sectional elevation of the fuel valve, recording apparatus, and directly associated parts along the line 2—2 of Fig. 1, some portions thereof being shown in elevation instead of in section.

Fig. 3 and Fig. 4 are detailed views of one of the record cards of the apparatus after having been partially used and a record made thereon, which record will be later explained.

Fig. 5 is a sectional view of the record card holding mechanism.

Fig. 6 is a sectional partial view along the line 6—6 of Fig. 2 showing the record marker, or means for punching the record card, and the record advancing mechanism.

Fig. 7 is a sectional view along the line 7—7 of Fig. 2 showing details of the float construction.

Fig. 8 is a transverse sectional view on the line 8—8 of Fig. 2 showing the mechanism transmitting the position of the float to the record marker and indicator hand.

Fig. 9 is a view of an alternative construction which may be used for the same purpose as that shown in Fig. 8.

Fig. 10 is a diagrammatic drawing illustrating the application of this invention to an automobile, showing the supply tank, recording apparatus, gasolene engine, the connection between the gasolene engine and its fuel supply, electric motor engine starter, storage battery for the latter, and hand operated electric switch for starting the gasolene engine whenever its starting is possible, electric wiring connections between this switch, the storage battery, starting motor, magnetic gear clutch solenoid and the recording apparatus. This drawing illustrates the relation of the parts by means of which the gasolene motor is incapacitated and rehabilitated when the recording apparatus is operated, and since the exact details of varied constructions of the various parts of an automobile as shown are well known to those skilled in the art, and as they form no part of the present invention, they are not shown in detail.

Fig. 11 is a diagrammatic drawing of the fuel valve 12 when in tank-filling position; the course of the gasolene through the valve while the tank is being filled being shown by a curved arrow, and the interruption of the gasolene supply to the motor which must pass through pipes 30 and 32 being made plain.

Fig. 12 is a diagrammatic drawing, also when in tank-filling position, of the electric switch construction on the underside of valve casing 13 showing how, in this position of the fuel valve, a short circuit of the wires leading from the valve-casing is effected by the handle 34.

Figs. 11 and 12 illustrate the tank-filling motor incapacitating position of the fuel valve.

Fig. 13 is a diagrammatic drawing of the fuel valve when in non-tank-filling position, showing the course of gasolene for filling purposes blocked, and the gasolene supply of the motor opened, the course of such gasolene supply being indicated by arrows.

Fig. 14 is a diagrammatic drawing, also in non-tank-filling position, of the electric switch construction on the underside of valve casing 13 showing how in this position of the fuel valve the connection of the wires leading from the valve casing is broken due to the position of handle 34.

Figs. 13 and 14 illustrate the non-tank-filling, motor rehabilitating position of the fuel valve.

The form of this exemplifying apparatus is one in which the combined record card and indicating dial lie flat upon the horizontal top of a supply tank, but it may be variously modified in form so as to be attached to the side or end of a tank, if desired, or to any curved contour thereof; or, if desired, so as to cause the combined card and dial to occupy a vertical instead of a horizontal position, by varying the positions of the filling aperture and tank opening and modifying the details of the float motion transmission mechanism.

The apparatus, as shown in the darwings, is illustrated with the valve in open position for filling the tank, and with the energy supply to the motor and to the motor starter broken.

The filling aperture is shown closed by the screw plug 10, which, when removed, places the apparatus in proper condition for filling the tank.

The gasolene, in filling the tank, passes from the filling aperture 11 (Fig. 1), through the conical fuel valve 12 within the seat 13 (Fig. 2), making a right angled horizontal turn therein, and into the engine supply tank 15 (shown broken) at the opening 14.

The float (to be later fully described) assumes a position in accordance with the level of gasolene within the tank, rocking the horizontal shaft 16, to which it is attached at 17 (Fig. 8 and Fig. 7), moving the projecting pin 19 fast with the disk 18 carried by said horizontal shaft 16 (see Fig. 2, Fig. 7 and Fig. 8), which in turn rocks the elbow yoke 20 engaging the pin 19. The elbow yoke 20 is fast to the vertical shaft 21, which passes upwardly out of the tank through the valve cover 22 and carries, at its top, a hub 23 to which the indicating hand 24 and the registering arm 25 are attached;—hence these members are caused to assume a given position answering to any corresponding given position of gasolene level within the tank.

In this form of the invention, both the hand and arm are placed below the record card 26 (see Fig. 4, Fig. 5 and Fig. 2), this card being translucent so that the indications are plainly seen through it, as the indicating hand 24 is black or red in color, while the remainder of the interior of the apparatus is white, or any other suitable color scheme may be employed.

This indicating hand 24 may be removably located above the record card 26, if desired, or may be omitted, as the registering arm 25 is visible through the record card 26 and will indicate the state of tank supply with reasonable accuracy, if that is all that is desired.

The indicating hand 24 is an ordinary hand similar in general to that employed on clocks; but the recording arm 25 is so constructed as to be rigid in the plane of the drawing Fig. 1, but flexible at right angles thereto, being rigidly attached to the hub 23, and carrying at its opposite extremity on the side next to the record card 26, a record marker, in this case a punching needle 27, and directly opposite to this needle a raised properly shaped actuating boss 28 (see Fig. 2); this recording arm 25 in this case being constructed of a flat flexible spring.

The gasolene fuel motor supply proceeds from the tank 15 upwardly through the fuel aperture in pipe 30 (see Fig. 2) to the fuel valve, thence through that valve (when in suitable position as shown in Fig. 13) to pipe 32 through this pipe to the carbureter 82 thence to the gasolene motor 83 wherein its combustion is utilized in the customary manner (see Fig. 10).

In the tank filling position of the fuel valve 12 (as shown in Figs. 1 and 2) the motor is incapacitated as the energy supply to the motor is broken, in this embodiment of the invention, by the severing of the gasolene supply to the motor, which, coming from the supply tank by pipe 30, is blocked by the conical surface of fuel valve 12 (Fig. 11); but when the fuel valve is fully closed against tank filling and advanced over its lap (Fig. 13), the motor is rehabilitated and may be operated, as the gasolene supply thereof passes from the tank through pipe 30, thence through port 31 (Fig. 13) and onward through pipe 32 to the motor providing for its operation; for in this fully closed position against tank filling of fuel valve 12, the port 31 is opposite to, and registers with, the aperture of pipes 30 and 32 passing through the valve casing, and the apparatus is preferably designed so that the motor is rendered inoperative whenever the fuel valve 12 is not in fully closed position against tank filling, as heretofore described.

In the drawings of this embodiment of the invention, (see Figs. 10, 11, 12, 13 and 14) there is also illustrated an additional method of rendering the gasolene motor alternately operative or inoperative by permitting or preventing the action of the electric starter which puts the gasolene motor in motion sufficiently to enable it to utilize the gasolene supply, according to the position of the fuel valve.

In Fig. 10, 83 represents the gasolene motor supplied with gasolene vapor and air in explosible form through the carbureter 82. An electric motor 84, supplied with current from a storage battery 85, carries upon its shaft the pinion 86, which is moved into and out of engagement with gear 87 upon the gasolene motor shaft by means of the solenoid clutch device 88, or in any other suitable manner.

When the gasolene motor is normally started the contacts of the switches 89 and 90 are made by means of the manually operated switch 91, whereupon the electric current from the storage battery 85 proceeds from wire 92 through wire 93 through 88 and 84 returning through wires 94 and 95 to the storage battery 85, rotating the gasolene motor shaft, whereupon the gasolene motor quickly starts into operation from its gasolene supply, whereupon switch 91 is opened manually and the operation of the electric motor ceases, being released from engagement with the gasolene motor, and deprived of electric current supply.

In such a starting of the gasolene motor the wires 96 and 97 are idle as their continuity is broken at the switches 33 on the fuel valve as shown in Fig. 14.

However, when the fuel valve is open for tank filling these switches 33 are connected as shown in Figs. 12, 6, 2 and 1 and in such case whenever switch 91 is closed in an attempt to start the gasolene motor the current from the storage battery 85 is short-circuited through wires 95, contact 89, wire 96, contact 35, brush 33, handle 34, brush 33, contact 36, wire 97, resistance 98, wire 97, contact 90, wire 92, thus rendering it impossible to start the gasolene motor because sufficient electricity to operate its electric starter cannot reach the latter, and in the exemplifying case illustrated the gasolene motor cannot be started by any other means. In Fig. 12 the electric motor starter of the liquid power generator is shown incapacitated by the short-circuiting of its supply of electricity from contact 35 to contact 36 through brushes 33 and the handle arm 34. When the apparatus is in position to rehabilitate the motor, as already described, the electric motor starter will be rehabilitated through the breaking of this short-circuiting by the running of the brushes 33 off the contacts 35 and 36, as shown in Fig. 14; and this method of incapacitating and rehabilitating this starter is merely one method of incapacitating and rehabilitating the exemplifying motor energized by the fuel supply of this invention, which method may be used alone or in connection with incapacitating or rehabilitating the gasolene motor by controlling its fuel supply, which may also be used alone if desired; these methods being independent of each other although each produces the same result.

This invention is not limited to the manner in which the energy arising from the combustion of liquid fuel is usefully applied, to the degree of directness of such application, to the exact form of motor employed, to the exact manner of incapacitating or rehabilitating such motor, or to the exact manner of preventing the realization of the useful effect derived from the combustion of liquid fuel during the period when the fuel tank may be filled or of permitting such useful effect to be realized when the tank is safely closed and it is impossible to fill it; as this feature of the invention is believed to be broadly new, as well as its record producing features.

Regarding the tank, as now replenished, and the indicating and recording apparatus being in a position corresponding to the amount of fluid within the tank, the fuel valve 12 is now closed against tank filling by revolving it in the direction of the arrow shown in Fig. 1 by means of the handle 29.

Rigidly attached to the upwardly projecting stem of fuel valve 12 are the curved triangularly sectioned record marker punch actuating arm 36' and the record card advancing arm 37, the latter carrying the ratchet pawl 38 at or near its outer extremity.

During this closing motion of fuel valve 12, the curved triangular sectioned punch actuating arm 36' will wipe by the actuation boss 28 of the spring recording arm 25 causing the record marker or punching needle 27 to perforate the record card 26 or to appropriately register the amount of fluid within the tank at this time, and then to immediately withdraw from the card.

The punch actuating arm 36' is curved in form, so as to always impinge upon the appropriately formed actuation boss 28 in a direction normal to the radius from the punching needle 27 to the center of shaft 21; so there is no tendency whatever to interfere with the accuracy of the measurement registered by its action upon the registering arm 25.

Also during this closing motion of fuel valve 12, the ratchet pawl 38 will be advanced in the direction of the arrow in Fig. 1, but during the first part of this motion it will be held away from engagement with the ratchet teeth 39 of the record card holder 40 (to be fully described later) by the guard 41 until it reaches the point 42 (see Fig. 6) where this guard terminates, at which time it will travel idly over the back of one tooth of this ratchet 39 and then engaging its appropriate tooth, will shift the record holder ahead, advancing it angularly to the extent of one ratchet tooth only; the punching of the record card 26 and the withdrawal of the record marker punching needle 27 therefrom having been accomplished before this advancing operation takes place, and energy supply to the motor not being established until it has been completed.

The motions of the fuel valve 12 are limited in one direction by the striking of the record card advancing arm 37 against the stop 43, and in the other direction by the striking of the curved triangularly sectioned punch actuating arm 36 against the stop 44 (see Fig. 6); these stops being formed by the opposite edges of a circular rib 45 attached to or forming a part of the valve cover 22, this rib having an inwardly projecting arm 46 carrying at the center of the apparatus the record card pin hub 47 in which the record card pin 48 is fixed (see Fig. 5 and Fig. 6).

The motor supply being now established the gasolene motor is operated, and upon again replenishing the supply tank the handle 29 is moved oppositely to the direction shown by the arrow in Fig. 1, back to the position shown in the drawings; first breaking the supply of energy to the motor at 30, 31 and 32, then punching the record card 26 by the wiping of arm 36' over actuating boss 28; then opening the fuel valve 12 for tank filling and returning the ratchet pawl 38 to the position shown in the drawings without moving the record card 26; whereupon the succeeding operation of the apparatus is as heretofore described.

All punching operations and the card advancing operation are preferably performed while the fuel valve 12 is passing over its lap, which lap it is necessarily obliged to travel over, (after the tank has been filled and before the liquid fuel can be utilized), so as to establish the energy supply to the motor, by opening the motor supply valve formed by the port 31 and the aperture through the valve casing 13 to which pipes 30 and 32, carrying the gasolene motor supply, are attached; or to close or open electrical switches in case a supply of electrical energy to the motor or its starter is interrupted, or to open an air supply valve, like and similarly arranged to the gasolene supply valve shown in the drawings; or to operate any or all of these, although the invention is not limited to any particular manner of rendering the motor alternatively inoperative and operative, or to the form of filling, or motor supply valves herein shown, or to any precise form of electrical switches or connections, the adaptation of all of which to this invention being obvious to those skilled in the art.

It is not necessary that the fuel valve shall be absolutely tight or that the punching and card advancing operations shall be totally performed while this fuel valve 12 is on its lap; it being only necessary that they take place while the motor is rendered inoperative and while the filling of the tank is substantially interrupted or sufficiently obstructed by the operation of the apparatus.

In the form of the invention herein illustrated, low levels and consequently small quantities of liquid within the tank are indicated and registered near the center of the combined indicator and record card 26; and high levels or large quantities near its outside circumference.

The combined indicator and record card (see Figs. 3 and 4) is circular in shape with a hole in its center fitting the record card pin 48.

It is preferably made of rather thin translucent paper or other suitable material, and is reinforced about its circumference and center hole by additional thicknesses of paper or pasteboard similar to the reinforced holes well known in shipping tags, or may be reinforced in other suitable manner or, preferably, it may be reinforced about the center only.

The apparatus may, however, be constructed so as to hold in place cards of uniform thickness without reinforcement, and operate with such cards, if desired.

In the former case (see Fig. 5) the record card is not pinched at its center but revolves freely upon record card pin 48 being merely held in place by the shoulders 49 and 50 abutting against it, but not clamping it; for the stiffness of its reinforcement gives sufficient resistance against the pressure of punching needle 27.

Shoulder 49 is formed by the record pin hub 47 and shoulder 50 is carried by the cover 51.

In the case of a plain thin card, its center is clamped between two screw washers forming a hub which latter revolves freely upon record pin 48.

This card is marked with a number of concentric circles properly calibrated in distance each from the other with reference to the shape of tank and the apparatus to which it is attached so as to indicate the presence of one gallon within the tank for each circle indicated or registered, and every circle indicating a multiple of five gallons is preferably made heavier or darker than the intermediate circles. The record card 26 shown in Figs. 3 and 4 is that of a tank holding twenty gallons of liquid.

The card is also provided with a number of curved radii thereupon intersecting the concentric circles and coinciding, in direction and curvature, with the path of the punching needle 27 as it swings about the center of its support and equal in number to that of the ratchet teeth 39; they are so positioned that the record of any given filling of the tank occurs midway between two of these curved radial lines; thus separating the different filling records clearly and definitely.

The outer circumference of the record card is held in the circular record card holder 40 (see Fig. 5) by means of the spring ring 52 which, by expanding into the angular groove 53 formed in the holder 44, exercises a strong wedging pressure upon the circumference of the record card against which it abuts, thus securely holding it in place against the flange 54 of the holder.

The method of holding the record card 26 in the apparatus herein described and shown leaves both its working surfaces free from obstruction and fully available for recording and observation, and the record cards may be renewed without removing the holder from the apparatus, upon the opening of the cover 51.

When the record card 26 is to be removed, this spring ring 52 is squeezed into a smaller circle by pinching the projections 55 and 56 together, thus releasing it from engagement with the angular groove 53 and the record card 26, and liberating the latter;— and when a new record card is introduced this spring ring 52 is conversely operated.

The record card holder is provided with ratchet teeth 39, already mentioned, and revolves in an exterior bearing which, in this instance, is formed in the edge of the valve cover 51 and 57; the ring being held in place by the cover 51, which is hinged to the valve cover at 58 swinging outwardly therefrom upon hinge pin 59 and when closed being held in such position by spring latch 60 and locked thereto in any approved manner, as by a padlock 61 (in Fig. 2), the key of which is retained by the owner of the apparatus or some authorized person.

This cover 51 is provided with a circular center panel of plate glass 62 carrying the center shoulder hub 50, through which panel the indications and records of the apparatus are visible; although the cover may be made of metal with a glazed aperture only large enough to properly exhibit the records and indications and to show when the record card approaches its recording capacity, if desired.

An example of the records made in the use of the apparatus is shown in Fig. 3, as follows:—

The first operation is the complete filling of the empty tank to capacity from 0 gallon to 20 gallons exhibited by the marks 63 and 64. Following this the car is used until it is seen by the indications of the apparatus that the tank supply is low, whereupon it is replenished to full capacity and the record marks 65 and 66 show a filling from a contents of 4 gallons to full capacity of 20 gallons. After further use of the car the owner sends it to the garage registering the state of tank supply at mark 67, which indicates 12 gallons within the tank.

Upon again receiving the car he again registers the amount of supply within the tank and since the amount of gasolene required to take the car to and from the garage is negligible he again finds practically 12 gallons within the tank as shown by mark 68.

Further use of the car and subsequent refilling of the tank are indicated by record marks 69 and 70.

On sending it again to the garage the registering made at mark 71 shows the presence of 11 gallons within the tank; but on registering the tank contents again upon the next receipt of the car, record mark 72 shows that 2½ gallons of gasolene have disappeared from the tank, naturally requiring an explanation from those in charge of the car.

It is now obvious that if this two and one-half gallons had been replaced in the tank, the record of filling in the same would be exhibited by the apparatus, and an explanation would equally be called for.

In the float system by means of which the level of liquid within the tank is determined, in this embodiment of the invention, a compensating and collapsible float is provided in order that its records and indications shall be practically unaffected by variations from normal horizontal level of the supply tank and that the float system may be easily introduced into the tank through a small opening therein; although the apparatus will operate with a good degree of accuracy when arranged with a properly designed single float, or with compensation applied for lengthwise variation of level only.

This exemplifying float system (see Fig. 7, Fig. 2 and Fig. 1) is composed of two cylindrical floats 73 and 74 whose axes are rotatable about their centers, being pivoted so as to swing on the rods 75 and 76, respectively; which rods are themselves pivoted together and are united into a single stiff rod by the engagement of a spring latch 77, carried by the rod 76 with the notch 78 on the hub of rod 75; which takes place after the float system has been introduced into the tank through aperture 14 with the floats closed together, from their being expanded by the workman's hand, which is also introduced into the tank through this aperture, during the process of attaching the apparatus to the tank before it is seated in the position shown in the drawings.

This stiff rod 75—76 thus formed is rotatable about the end projection 79 of the swinging rod 80 attached to the horizontal shaft 16 at 17, as has been heretofore described.

The position of the point 79 measures the quantity of liquid within the tank, the means of transmitting the position of this point to the indicating and recording apparatus having been previously described.

It will be noted that these floats are inter-pivoted so that any descent in position by one float, when accompanied by a corresponding ascent in position of its companion float, causes no variation in the position of the main pivotal point of the system 79 by which the amount of liquid in the tank is measured.

Variation in horizontal level of the tank in a longitudinal direction is compensated by the swing of the float system about 79; and in a transverse direction by the swing of the cylindrical floats 73 and 74 about the rods 75 and 76 respectively, the swinging bearing on 80 being located so as to vibrate substantially in the vertical center axis of the tank.

Instead of the swinging cylindrical floats 73 and 74 two pairs of inter-pivoted single floats may be used, if desired.

The weight of the floats and their connections is properly counter-balanced at 81.

Disclosures of new inventive matter in this specification being capable of more general utility in the arts than as associated with the present invention, and herein claimed, are reserved as subject matter for separate application for patent by the inventor in which application references will be made to this specification.

Many variations in the construction of details, and the location and relative arrangement of parts, would readily suggest themselves to those skilled in the art to which this invention relates, and still fall within the spirit and scope of my invention; hence I do not desire to be limited to the exact construction herein set forth; but having explained the principles of my invention; and a preferred form of apparatus embodying it, and Having described the function, purpose and mode of operation of such apparatus, what I claim as new and of my own invention, and desire to secure by Letters Patent of the United States is:—

1. A liquid power fuel supply tank, a motor connected and adapted to be energized from the combustion of said fuel supply, supply recording mechanism, and means constructed and arranged to alternatively permit replenishment of said tank and coincidently incapacitate said motor or to obstruct replenishment of said tank and coincidently rehabilitate said motor.

2. A liquid power fuel supply tank, a motor connected and adapted to be energized from the combustion of said fuel supply, means for alternatively permitting replenishment of said tank and coincidently incapacitating said motor or obstructing replenishment of said tank and coincidently rehabilitating said motor, supply recording mechanism, and means constructed, connected and arranged to operate said supply recording mechanism between the periods of motor incapacitation and motor rehabilitation.

3. A liquid power fuel supply tank, a motor connected and adapted to be energized from the combustion of said fuel supply, means for alternatively permitting replenishment of said tank and coincidently incapacitating said motor or obstructing replenishment of said tank and coincidently rehabilitating said motor, supply recording means, record advancing mechanism, and means constructed, connected and arranged to operate said record advancing mechanism between the periods of motor incapacitation and motor rehabilitation.

4. A liquid power fuel supply tank, a motor connected and adapted to be energized from the combustion of said fuel supply, means for alternatively permitting replenishment of said tank and coincidently incapacitating said motor or obstructing replenishment of said tank and coincidently rehabilitating said motor, supply recording means, record advancing mechanism and means constructed and arranged to operate said supply recording means and said record advancing mechanism.

5. A liquid power fuel supply tank, a motor connected and adapted to be energized from the combustion of said fuel supply, means for alternatively permitting replenishment of said tank and coincidently incapacitating said motor or obstructing replenishment of said tank and coincidently rehabilitating said motor, supply indicating and recording mechanism, and means constructed and arranged to actuate said mechanism for record producing between the periods of motor incapacitation and motor rehabilitation, independently of its operation for indication.

6. A liquid power fuel supply tank, a motor connected and adapted to be energized from the combustion of said fuel supply, supply recording mechanism, and means constructed and arranged to alternately permit replenishment of said tank and coincidently to interrupt the fuel supply to said motor or to obstruct replenishment of said tank and coincidently to permit fuel supply to reach said motor.

7. A liquid power fuel supply tank, a motor connected and adapted to be energized from the combustion of said fuel supply, means constructed and arranged to alternatively permit replenishment of said tank and coincidently to interrupt the fuel supply to said motor or to obstruct replenishment of said tank and coincidently to permit fuel supply to reach said motor, supply recording mechanism, and means constructed, connected and arranged to operate said supply recording mechanism between the periods of motor incapacitation and motor rehabilitation.

8. A liquid power fuel supply tank, a motor connected and adapted to be energized from the combustion of said fuel supply, means constructed and arranged to alternatively permit replenishment of said tank and coincidently to interrupt the fuel supply to said motor or to obstruct replenishment of said tank and coincidently to permit fuel supply to reach said motor, supply recording means, record advancing mechanism, and means constructed, connected and arranged to operate said record advancing mechanism between the periods of motor incapacitation and motor rehabilitation.

9. A liquid power fuel supply tank, a motor connected and adapted to be energized from the combustion of said fuel supply, means constructed and arranged to alternatively permit replenishment of said tank and coincidently to interrupt the fuel supply to said motor or to obstruct replenishment of said tank and coincidently to permit fuel supply to reach said motor, supply recording means, record advancing mechanism and means constructed and arranged to operate said supply recording means and said record advancing mechanism between the periods of motor incapacitation and motor rehabilitation.

10. A liquid power fuel supply tank, a motor connected and adapted to be energized from the combustion of said fuel supply, means constructed and arranged to alternatively permit replenishment of said tank and coincidently to interrupt the fuel supply to said motor or to obstruct replenishment of said tank and coincidently to permit fuel supply to reach said motor, supply indicating and recording mechanism, and means constructed and arranged to actuate said mechanism for record producing between the periods of motor incapacitation and motor rehabilitation, independently of its operation for indication.

11. A liquid power fuel supply tank, a motor connected and adapted to be energized from the combustion of said fuel supply, a filling aperture for said tank, means for incapacitating and rehabilitating said motor, supply recording mechanism; in combination with a movable member constructed and arranged so as when in one position to open said filling aperture only when the motor is incapacitated, and in another position to obstruct said aperture whenever the generator is rehabilitated and in connection therewith to actuate the said supply recording mechanism between these positions.

12. A liquid power fuel supply tank, a motor connected and adapted to be energized from the combustion of said fuel supply, a filling aperture for said tank, means for incapacitating and rehabilitating said motor, supply recording mechanism and record advancing means; in combination with a movable member constructed and arranged so as when in one position to open said filling aperture only when the motor is incapacitated, and in another position to obstruct said aperture whenever the generator is rehabilitated and in connection therewith to actuate the said supply recording mechanism and said record advancing means between these positions.

13. In a liquid power fuel supply tank apparatus provided with a tank filling aperture and means for alternatively opening and obstructing said aperture and embracing a motor connected and adapted to be energized from the combustion of said fuel supply, and means for alternatively incapacitating and rehabilitating said motor; supply recording mechanism and record advancing means; the combination therewith of a member movable between two fixed positions, said member being constructed and arranged to be brought from one of said fixed positions to the other of said fixed positions, thereby obstructing said filling aperture, later actuating said supply recording mechanism, still later actuating said record advancing means, and finally rehabilitating said motor; and when moved reversely, incapacitating said motor, later actuating said supply recording mechanism and finally opening said tank-filling aperture.

14. In a liquid power fuel supply tank apparatus provided with a tank filling aperture and a valve therefor, and embracing a motor connected and adapted to be energized from the combusion of said fuel supply, a valve for the motor fuel supply from the tank, and supply recording mechanism; the combination therewith of a movable member constructed and arranged to actuate said valves and said supply recording mechanism.

15. In a liquid power fuel supply tank apparatus provided with a tank filling aperture and a valve therefor, and embracing a motor connected and adapted to be energized from the combustion of said fuel supply, a valve for the motor fuel supply from the tank, supply recording mechanism, and record advancing means; the combination therewith of a movable member constructed and arranged to actuate said valves, said supply recording mechanism, and said record advancing means.

16. In a liquid power fuel supply tank apparatus provided with a tank filling aperture and a fuel supply aperture, and embracing a motor connected and adapted to be energized by the combustion of said fuel supply, supply recording mechanism, a valve for the filling aperture and a valve for the fuel supply aperture, said valves and said supply recording mechanism being so connected and constructed that opening the filling aperture valve closes the fuel supply valve and opening the fuel supply valve closes the filling aperture valve; while in an intermediate portion of either valve operating motion the supply recording mechanism is operated.

17. In a liquid power fuel supply tank apparatus provided with a tank filling aperture and a fuel supply aperture, and embracing a motor connected and adapted to be energized by the combustion of said fuel supply, supply recording mechanism, record advancing means, a valve for the filling aperture and a valve for the fuel supply aperture, said valves and said supply recording mechanism being so connected and constructed that opening the filling aperture valve closes the fuel supply valve and opening the fuel supply valve closes the filling aperture valve; while an intermediate portion of either valve operating motion the supply recording mechanism and the record advancing means are operated.

18. In a liquid power fuel supply tank apparatus provided with a tank filling aperture and a fuel supply aperture, and embracing a motor connected and adapted to be energized by the combustion of said fuel supply, supply recording mechanism, record advancing means, a valve for the filling aperture and a valve for the fuel supply aperture, these valves, the supply recording mechanism and the record advancing mechanism being so connected and constructed that they are operable from a movable member that is brought from one fixed position to another fixed position thereby closing the tank-filling aperture valve, later actuating said supply recording mechanism, still later actuating said record advancing means and finally opening the fuel supply valve; and when moved reversely, closing the fuel supply valve, later actuating said supply recording mechanism and finally opening said tank-filling aperture valve.

19. The combination with a liquid power fuel supply tank, a motor connected and adapted to be energized from the combustion of said fuel supply, of supply record marking mechanism, a translucent card to receive the record and means constructed and arranged to alternatively permit replenishment of said tank and coincidently incapacitate said motor or to obstruct replenishment of said tank and coincidently rehabilitate said motor.

20. The combination with a liquid power fuel supply tank, a motor connected and adapted to be energized from the combustion of said fuel supply, of supply record marking mechanism, a record card to receive the record, a record card holder, a disengageable spring member pressing said record card between opposing surfaces when engaged, and permitting the removal of said record card from said holder when disengaged and means constructed and arranged to alternatively permit replenishment of said tank and coincidently incapacitate said motor or to obstruct replenishment of said tank and coincidently rehabilitate said motor.

21. The combination with a liquid fuel supply tank, a motor connected and adapted to be energized from the combustion of said fuel supply, of a record marker, a record card to receive the record marking, supporting means for said record marker constructed and arranged to permit actuating motion to and from said record card only, connections between said supporting means and the liquid within the tank which move said supporting means and record marker to a position commensurate with the amount of liquid contained within the tank, and actuating means for said record marker provided with surfaces constructed and arranged so as to exercise no effect over said commensurate position; and means constructed and arranged to alternatively permit replenishment of said tank and coincidently incapacitate said motor or to obstruct replenishment of said tank and coincidently rehabilitate said motor.

22. The combination with a liquid fuel supply tank, a motor connected and adapted to be energized from the combustion of said fuel supply, of supply record marking mechanism, a record card to receive said marking, an actuation boss upon and forming a part of said supply record marking mechanism, a cam member constructed and arranged to actuate said record marking mechanism through said boss, and means constructed and arranged to alternatively permit replenishment of said tank and coincidently incapacitate said motor or to obstruct replenishment of said tank and coincidently rehabilitate said motor.

23. The combination with a liquid power fuel supply tank, a motor connected and adapted to be energized from the combustion of said fuel supply, a record card, a holder for said record card provided with a ratchet for advancing said holder, record marking mechanism, connections between said record marking mechanism and the liquid level within the said supply tank moving said record marking mechanism commensurately therewith, means constructed and arranged to alternatively permit replenishment of said tank and coincidently incapacitate said motor or to obstruct replenishment of said tank and coincidently rehabilitate said motor, and an actuating member which in being moved in one direction operates means effecting obstruction of tank replenishment, later actuates the record marking mechanism, still later actuates the ratchet advancing the record card holder and finally operates means effecting rehabilitation of the motor; and in being moved reversely operates means effecting incapacitation of the motor, later actuates the record marking mechanism and finally operates means effecting permission of tank replenishment.

24. The combination with a liquid power fuel supply tank, a motor connected and adapted to be energized from the combustion of said fuel supply, record marking mechanism, means for positioning said record marking mechanism correspondingly to the liquid level within the tank, motor and tank controlling means constructed and arranged to alternatively permit replenishment of said tank and coincidently incapacitate said motor or to obstruct replenishment of said tank and coincidently rehabilitate said motor, of a movable member connected with said motor and tank controlling means and engaging said record marking mechanism.

25. A liquid power fuel supply tank, a motor connected and adapted to be energized from the combustion of said fuel supply, supply indicating mechanism and means constructed and arranged to alternatively permit replenishment of said tank and coincidently incapacitate said motor or to obstruct replenishment of said tank and coincidently rehabilitate said motor.

26. A liquid power fuel supply tank, a motor connected and adapted to be energized from the combustion of said fuel supply, supply recording mechanism, supply indicating mechanism and means constructed and arranged to alternatively permit replenishment of said tank and coincidently incapacitate said motor or to obstruct replenishment of said tank and coincidently rehabilitate said motor.

27. The combination with a liquid fuel supply tank, a motor connected and adapted to be energized from the combustion of said fuel supply, record marking mechanism, a plurality of interpivoted floats within said tank, connections between said floats and said record marking mechanism positioning the latter correspondingly to the liquid level within said tank, means constructed and arranged to alternatively permit replenishment of said tank and coincidently incapacitate said motor or to obstruct replenishment of said tank and coincidently rehabilitate said motor; of a movable member connected with said motor and tank controlling means, and engaging said record marking mechanism.

28. The combination with a liquid fuel supply tank, a motor connected and adapted to be energized from the combustion of said fuel supply, indicating mechanism, a plurality of interpivoted floats within said tank, connections between said floats and said indicating mechanism positioning the latter correspondingly to the liquid level within said tank, means constructed and arranged to alternatively permit replenishment of said tank and coincidently incapacitate said motor or to obstruct replenishment of said tank and coincidently rehabilitate said motor, of a manually movable member connected with said motor and tank controlling means.

29. The combination with a liquid fuel supply tank, a motor connected and adapted to be energized from the combustion of said fuel supply, record marking mechanism, a plurality of floats within said tank, supporting members connected at one end to each of said floats and at the other end rotatable about a pivot connection; and a latch member constructed and arranged to hold said supporting members rigidly together when said floats are separated, connections between said floats and said record marking mechanism positioning the latter correspondingly to the liquid level within said tank, means constructed and arranged to alternatively permit replenishment of said tank and coincidently incapacitate said motor or to obstruct replenishment of said tank and coincidently rehabilitate said motor, of a movable member connected with said motor and tank controlling means and engaging said record marking mechanism.

30. The combination with a liquid fuel supply tank, a motor connected and adapted to be energized from the combustion of said fuel supply, record marking mechanism, an expansible float member within said tank, an opening in said tank permitting the introduction of said float member when unexpanded, means for holding said float member expanded within said tank, connections between said float member and said record marking mechanism positioning the latter correspondingly to the liquid level within said tank, means constructed and arranged to alternatively permit replenishment of said tank and coincidently incapacitate said motor or to obstruct replenishment of said tank and coincidently rehabilitate said motor; of a movable member connected with said motor and tank controlling means and engaging said record marking mechanism.

31. The combination with a liquid power fuel supply tank, a motor connected and adapted to be energized from the combustion of said fuel supply, a record marker, means for moving said record marker to a position commensurate with the liquid level within the tank, motor and tank controlling means constructed and arranged to alternatively permit replenishment of said tank and coincidently incapacitate said motor or to obstruct replenishment of said tank and coincidently rehabilitate said motor, of a movable member connected with said motor and tank controlling means and engaging and preventing displacement of said positioned record marker.

EDWIN S. MATTHEWS.

Witnesses:
 ALICIA V. OLVANY,
 HOBART V. CORNWELL.